(12) United States Patent
Lin

(10) Patent No.: US 11,991,132 B2
(45) Date of Patent: May 21, 2024

(54) MESSAGE EMBEDDING AND EMULATION IN ENTROPY ENCODER-DECODER NETWORKS

(71) Applicant: QUALCOMM Incorporated, San Diego, CA (US)

(72) Inventor: Jamie Menjay Lin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/184,419

(22) Filed: Mar. 15, 2023

(65) Prior Publication Data

US 2023/0300097 A1 Sep. 21, 2023

Related U.S. Application Data

(60) Provisional application No. 63/269,587, filed on Mar. 18, 2022.

(51) Int. Cl.
*H04L 51/21* (2022.01)
*H04L 41/16* (2022.01)
*H04W 4/12* (2009.01)

(52) U.S. Cl.
CPC .............. *H04L 51/21* (2022.05); *H04L 41/16* (2013.01); *H04W 4/12* (2013.01)

(58) Field of Classification Search
CPC ........... H04L 51/21; H04L 41/16; H04W 4/12
USPC ........................................................ 709/204
See application file for complete search history.

(56) References Cited

U.S. PATENT DOCUMENTS

| | | | |
|---|---|---|---|
| 2019/0190653 A1* | 6/2019 | Langhammer | H04L 1/0057 |
| 2022/0014939 A1* | 1/2022 | Colom Ikuno | G06F 9/541 |
| 2022/0368349 A1* | 11/2022 | Luo | H03M 13/1105 |
| 2023/0090477 A1* | 3/2023 | Mack | G06N 3/0455 |
| | | | 706/62 |

\* cited by examiner

*Primary Examiner* — Hee Soo Kim
(74) *Attorney, Agent, or Firm* — Patterson + Sheridan, LLP

(57) ABSTRACT

Certain aspects of the present disclosure provide techniques and apparatus for messaging in a wireless communications system using neural networks. An example method generally includes receiving a first message and a second message, wherein the second message comprises a secret message to be hidden in the first message. The first message and second message are combined into a combined message. An emulation message is generated through an encoder neural network based on the combined message. The emulation message generally comprises a message decodable by a receiving device into the first message. The emulation message is output emulation message for transmission to the receiving device.

27 Claims, 8 Drawing Sheets

MESSAGE EMBEDDING AND EMULATION IN ENTROPY ENCODER-DECODER NETWORKS

CROSS-REFERENCE TO RELATED APPLICATIONS

This application claims priority to and benefit of U.S. Provisional Patent Application Ser. No. 63/269,587, entitled "Message Embedding and Emulation in Entropy Encoder-Decoder Networks," filed Mar. 18, 2022, and assigned to the assignee hereof, the entire contents of which are incorporated by reference herein.

INTRODUCTION

Aspects of the present disclosure relate to using neural networks to generate messages in a wireless communications system.

In a wireless communications system, messaging is generally exchanged between different devices (e.g., network entities, such as base stations, user equipments (UEs), etc.) in order to transmit and/or receive information. In some cases, the devices in the wireless communications system may be heterogeneous in terms of supported functionalities. For example, legacy devices may support a subset of the functionality of non-legacy devices. In another example, devices from one manufacturer may support features that are not supported by devices from other manufacturers. However, because these devices may generally support a common set of features, the messaging generated to communicate amongst devices in a wireless communications network may be structured to comply with some basic defined set of parameters. For example, messaging may be established such that all devices in the wireless communications system can understand, decode, and process messaging for features related to the common set of features supported by all devices in the wireless communications system.

To support features that are outside the common set of features supported by all devices in the wireless communications system, various techniques can be used. In some cases, existing messages can include reserved fields designated for use in newer generations of wireless communications networks. In other cases, additional messaging may be defined to support non-legacy features, manufacturer-specific features, or the like. However, the use of reserved fields and/or additional messaging may impose additional transmission and reception overhead, increase the amount of power used in transmitting and receiving messages, and otherwise represent an inefficient use of resources in a wireless communications system.

Accordingly, what is needed are improved techniques for generating transmitting, receiving, and decoding messaging in wireless communications systems.

BRIEF SUMMARY

Certain aspects provide a method for generating messaging in a wireless communications system. An example method generally includes receiving a first message and a second message, wherein the second message comprises a secret message to be embedded into inside the first message. The first message and second message are combined into a combined message. An emulation message is generated through an encoder neural network based on the combined message. The emulation message generally comprises a message decodable by a receiving device into the first message, regardless of whether the receiving device supports messaging using the second message included in the combined message. The emulation message is output emulation message for transmission to a receiving device.

Certain aspects provide a method for receiving messaging in a wireless communications system. An example method generally includes receiving an emulation message for processing, wherein the emulation message comprises a message decodable by a receiver into a first message. The emulation message is decoded into an approximation of the first message and an approximation of a second message through a decoder neural network. Generally, the second message comprises a secret message hidden within the first message. One or more actions are taken based on the approximation of the first message and the approximation of the second message.

Certain aspects provide a method for communicating in a wireless communications system. An example method generally includes combining a first message and a second message into a combined message. An emulation message is generated through an encoder neural network based on the combined message, and the emulation message generally comprises a message decodable by a receiving device into the first message. The emulation message is decoded into an approximation of the first message and an approximation of the second message through a decoder neural network. One or more actions are taken based on the approximation of the first message and the approximation of the second message.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

Figure 1:
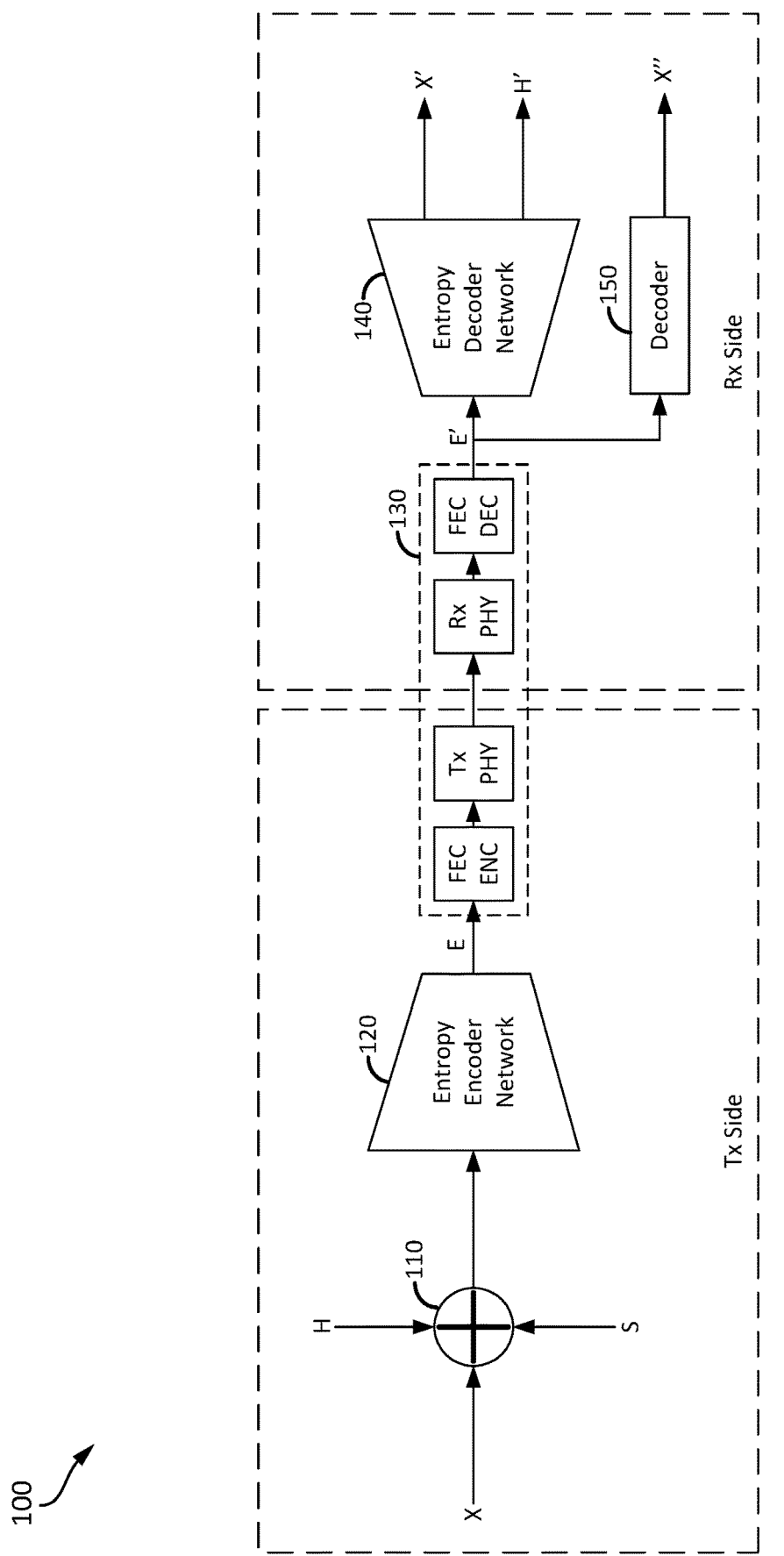
FIG. 1 depicts an example communications pipeline for transmitting and receiving emulation messages generated and decoded using an encoder-decoder neural network, according to aspects of the present disclosure.

To facilitate understanding, identical reference numerals have been used, where possible, to designate identical elements that are common to the drawings. It is contemplated that elements and features of one aspect of the present disclosure may be beneficially incorporated in other aspects of the present disclosure without further recitation.

DETAILED DESCRIPTION

Aspects of the present disclosure provide techniques and apparatus for encoding, transmitting, receiving, and decoding emulation messages including a first message and an embedded second message (also referred to as a hidden message) in a wireless communications system via an encoder-decoder neural network. Generally, these emulation messages may appear to be valid messages according to a defined message format (e.g., in a wireless communications standard, such as various revisions of the 802.11 Wi-Fi standard, the Long Term Evolution (LTE) standard, the New Radio (NR) standard, or the like) but may include additional information usable by devices that support additional functionality beyond that defined in any particular standard (e.g., to support manufacturer-specific functionality or the like).

In a wireless communications network, standardized messages having defined formats (e.g., acknowledgment/negative acknowledgment (ACK/NACK) messages, messages used in communicating information for initial access (random access messages) or handover from one cell in a wireless network to another, messages used to report signal quality (e.g., channel state information (CSI) messages), or the like) may be used to transmit information to and receive information from other devices in the wireless communications network. These standardized messages generally include a defined payload according to a defined format that can be understood by any participant in the wireless communications network. Because messages may be standardized, any device that complies with a communications standard defining the messaging and the associated behavior of transmitting and receiving devices can participate in a wireless communications network. Further, to support backwards compatibility, the defined format for these messages (e.g., specifying different groups of bits within a message) may remain static over time; new communications standards may assign different meanings to portions of a message for non-legacy devices and may introduce new messaging, but typically may not change meaning assigned to different portions of the message for legacy devices.

Because message formats and payloads in wireless communications networks may be standardized, adding new features in wireless communications networks may be achieved by using reserved fields of previously defined messages or by defining new messaging. Using reserved fields of previously defined messages may be feasible, such as when reserved fields exist in a previously defined message and are available for use (e.g., have not been used for other purposes, such as other features defined in a communications standard). Further, when reserved fields are unused, resources may be wasted by transmitting null information in these reserved fields. Adding new messaging in a wireless communications system may allow for new features to be introduced (e.g., device-manufacturer-specific features) without redefining existing messaging. However, this may also increase the transmission overhead in a wireless communications system and may waste resources and processing power, especially for devices that are unable to successfully decode this new messaging.

Aspects of the present disclosure provide techniques that allow for the efficient generation, transmission, reception, and decoding of signaling in wireless communications systems using encoder-decoder neural networks, with the encoder being used for the generation and transmission of signaling and the decoder being used for processing received signaling. Extended messaging—representing messaging related to new features and/or extensions to existing features, device-manufacturer-specific features, or the like—may be embedded within standard messages. These standard messages may be decodable by any device in the wireless communications system. Because the extended messaging may be embedded within the standard messages, extended messaging may be transmitted in a wireless communications system without incurring the additional overhead of transmitting the extended messaging as standalone messages. Further, because the extended messaging is embedded within a standard message, devices that do not support the features included in or otherwise associated with the extended messaging may be unaware that such extended messaging is embedded in the standard message; rather, the standard message can be decoded according to the typical rules established (e.g., by a communications standard) for processing such messaging. Thus, aspects of the present disclosure may reduce transmission overhead in wireless communications system involved in transmitting messages related to new features or non-standard features, while allowing such messages to be transmitted within standard messages that are understandable by any device in a wireless communications system. Further, the embedding of extended messaging in standard messaging may reduce power utilized in transmitting and receiving messages, as a single message may be transmitted to communicate standard and extended messages instead of communicating standard messaging and extended messaging in separate transmissions.

Example Encoder-Decoder Message Generation Pipeline

FIG. 1 illustrates an example communications pipeline 100 for transmitting and receiving emulation messages generated and decoded using an encoder-decoder neural network, according to aspects of the present disclosure.

To allow for a first message (also referred to as a standard message) and a second message (also referred to as an extended message) to be transmitted in a single message, communications pipeline 100 includes an encoder-decoder neural network (including encoder network 120 and decoder network 140) configured to generate and decode an emulation message including both the first message and the second message. The emulation message generally may be a message that, when decoded by a standard message decoder at a receiving device, results in the recovery of the first message (or at least an approximation of the first message). When decoded using a decoder neural network (e.g., the decoder portion of an encoder-decoder neural network trained to generate and decode emulation messages), however, both an approximation of the first message and an approximation of the second message may be recovered.

As illustrated, pipeline 100 includes a message combiner 110, entropy encoder network 120, physical (PHY) layer 130, entropy decoder network 140, and decoder 150. Message combiner 110, entropy encoder network 120, and the forward error correction (FEC) encoder and transmit (Tx) PHY layer components of PHY layer 130 may be located at a transmitting device, while the receive (Rx) PHY layer components and FEC decoder of PHY layer 130, entropy decoder network 140, and decoder 150 may be located at the receiving device. Generally, entropy decoder network 140 may recover a first message and a second message from a received message using a neural network, and decoder 150 may decode the received message into the first message in parallel (or substantially in parallel), without using a neural network. While pipeline 100 is illustrated as including both entropy decoder network 140 and decoder 150, it should be recognized that decoder 150 need not be used to decode received messages. It should be understood that a device may include both the transmission and reception-side components, in order to allow such a device both to generate and transmit an emulation message including the first message and second message and to decode a different first message and second message from a received emulation message.

As illustrated and discussed in further detail herein, message combiner 110 may take a first message X, a second message H, and (in some aspects) supplemental information S and generate a combined message to be encoded by entropy encoder network 120. In some aspects, the first message X may be a standard message usable by legacy devices, and the second message H may be an extended message having information that is usable to enable various features supported by non-legacy devices. In another example, the first message X may be a message formatted according to a wireless communications standard (e.g., defined formats of messages in various revisions to the 802.11 Wi-Fi standard, in the Long Term Evolution (LTE) standard, the New Radio (NR) standard, etc.), and the second message H may be an extended message not defined by a wireless communications standard or defined in a new wireless communications standard. For example, the second message X may be a device-manufacturer-specific message to enable manufacturer-specific functionality.

First message X may include i bit fields of varying levels of stochasticity and may be represented by the equation:

$$X = \bigvee_i x_i,$$

where V represents a bit concatenation operation, and $x_i \in \{0, 1\}$ represents that value of the $i^{th}$ bit field. Each bit field $x_i$ is stochastic in nature, as there is no general pattern as to whether a bit field $x_i$ has a value of 0 or 1. Each bit field $x_i$ is also conditionally stochastic with other bits, as realistic bit values in a message X for a given bit $x_i$ may, in some cases, depend upon or otherwise have some relation to other bit values in the message X. For example, for a first field with some given value a, the range of valid values for a second field may be $b \sqsubset B$, where B represents the whole range of values for the related field and b represents the subset of valid values for the second field when the first field has a value a.

In some aspects, the supplemental information S included in the combined message may include various metrics that can be used by entropy encoder network 120 to generate the embedded message. For example, the supplemental information may include historical signal quality or historical channel quality information metrics. The signal quality or channel quality information metrics may include information such as a received signal strength indicator (RSSI), reference signal received quality (RSRQ) metric, a channel quality indicator (CQI), a modulation and coding scheme (MCS), a bit error rate or block error rate, or the like. The supplemental information may, in some aspects, be used by the entropy encoder network 120 to generate emulation messages that appear realistic, in view of the signal quality metrics or channel quality information metrics at the time at which such a message is generated. For example, the use of the supplemental information S to generate the emulation message can be used to ensure that values in some fields would appear to be accurate for the current state of the channel on which these messages are transmitted, which may further allow for the emulation message to be successfully decoded by a standard message decoder.

Entropy encoder network 120 generally generates an emulation message E from the combined message {X, H, S} generated by message combiner 110. As discussed, the entropy encoder network 120 may generate an emulation message E that, when decoded by decoder 150, results in the recovery of an approximation X' 152 of first message X and, when decoded by entropy decoder network 140, results in the recovery of an approximation X' 142 of first message X and an approximation H' 144 of second message H. Generally, in encoding the combined message {X, H, S} into message E∈M, the combined message may be encoded into fewer bits than the total number of bits of first message X and second message H based on the field stochasticity of the first message X, in which the fields of X are random and may not be predictable based on the values of other fields in the first message X.

Emulation message E may be output by entropy encoder network 120 to the FEC encoder and transmission components of the PHY layer 130 for transmission to a receiving device. Generally, the FEC encoder may apply channel coding and a cyclic redundancy check to emulation message E to ensure error-free (or error-minimized) delivery of emulation message E to the receiving device. At the receiving device, the receiver PHY layer and FEC decoder components of the PHY layer 130 may be used to recover an approximation E' of emulation message E. Due to the forward error correction applied to emulation message E at the transmitting device, E=E', under a constraint of a target message block error rate.

As illustrated, E' may be delivered to an entropy decoder network 140 and to a decoder 150 for processing. Entropy decoder network 140, as discussed, is generally configured to recover approximations of both X' and H' from E', while decoder 150 is generally configured to decode E' into X". X' and X" may be processed using legacy processing techniques, while H' may be processed using non-legacy techniques. Generally, X' and X" may be equivalent messages, recovered from E' using different techniques.

To generate emulation messages E that can be successfully decoded by decoder 150 into first message X (or suitable approximations thereof), entropy encoder network 120 and entropy decoder network 140 may be trained to minimize, or at least reduce, a total loss that is the sum of a carrier message loss, hidden message loss, emulation message loss, and public performance loss.

Carrier message loss $L_X$ may be represented by the equation:

$$L_X = \sum_i \|x_i - x_{i'}\|^N, x_i \in X, x'_i \in X', N \in \{1,2\},$$

where $x_i$ represents the $i^{th}$ bit in message X, $x'_i$ represents the $i^{th}$ bit in message X', and N represents a power to apply in calculating the loss for each combination of $x_i$ and $x'_i$ (e.g., linear loss or squared loss).

Hidden message loss $L_H$ may be represented by the equation:

$$L_H = \sum_i \|h_i - h'_i\|^N, h_i \in H, h'_i \in H', N \in \{1,2\},$$

where $h_i$ represents the $i^{th}$ bit in message H, $h'_i$ represents the $i^{th}$ bit in message H', and N represents a power to apply in calculating the loss for each combination of $h_i$ and $h'_i$ (e.g., linear loss or squared loss).

Emulation message loss $L_E$ may be represented by the equation:

$$L_E = \sum_i \|e_i - m_i^K\|^N, e_i \in E, m_i^K \in M^K, N \in \{1,2\},$$

where $$M^K = \underset{M^k \in M}{\operatorname{argmin}} \|E - M^K\|, M = \{M^0, M^1, ...\}$$

represents the set of legitimate messages that can be transmitted, $e_i$ represents the $i^{th}$ bit in the emulation message E, $m_i$ represents the $i^{th}$ bit in message M (which may be a message from the set of legitimate messages $M^K$), N represents a power to apply in calculating the loss for each combination of $e_i$ and $m_i$ (e.g., linear loss or squared loss), and K represents an index of a message $M^K$ in the set of legitimate messages.

Finally, public performance loss $L_P$ may be represented by the equation:

$$L_P = \sum_i \alpha_i \|q_i - p_i\|^N,$$

where $p_i$ is the $i^{th}$ ideal performance metric, $q_i$ is the $i^{th}$ predicted performance metric, $a_i$ is the hyperparameter weight for the $i^{th}$ performance metric, and N represents a power to apply in calculating the loss.

The total loss function to be minimized may be represented by the equation:

$$L = \lambda_X L_X + \lambda_H L_H + \lambda_E L_E + \lambda_P L_P,$$

where $\lambda$ corresponds to a hyperparameter for a respective loss term.

The entropy of message X may be represented by the equation:

$$\operatorname{Entropy}(X) = -\sum_i p(x_i) \log p(x_i)$$

where $p(x_i)$ represents the probability of the $i^{th}$ bit field having a specific value (i.e., 0 or 1). To entropy encode the combined message into emulation message E, entropy encoder network 120 can minimize a loss of information by minimizing a divergence between p(X) and p(E), conditioned on the supplemental information S. In some aspects, X and E may be considered stochastic, while H may be considered non-stochastic.

Figure 2:
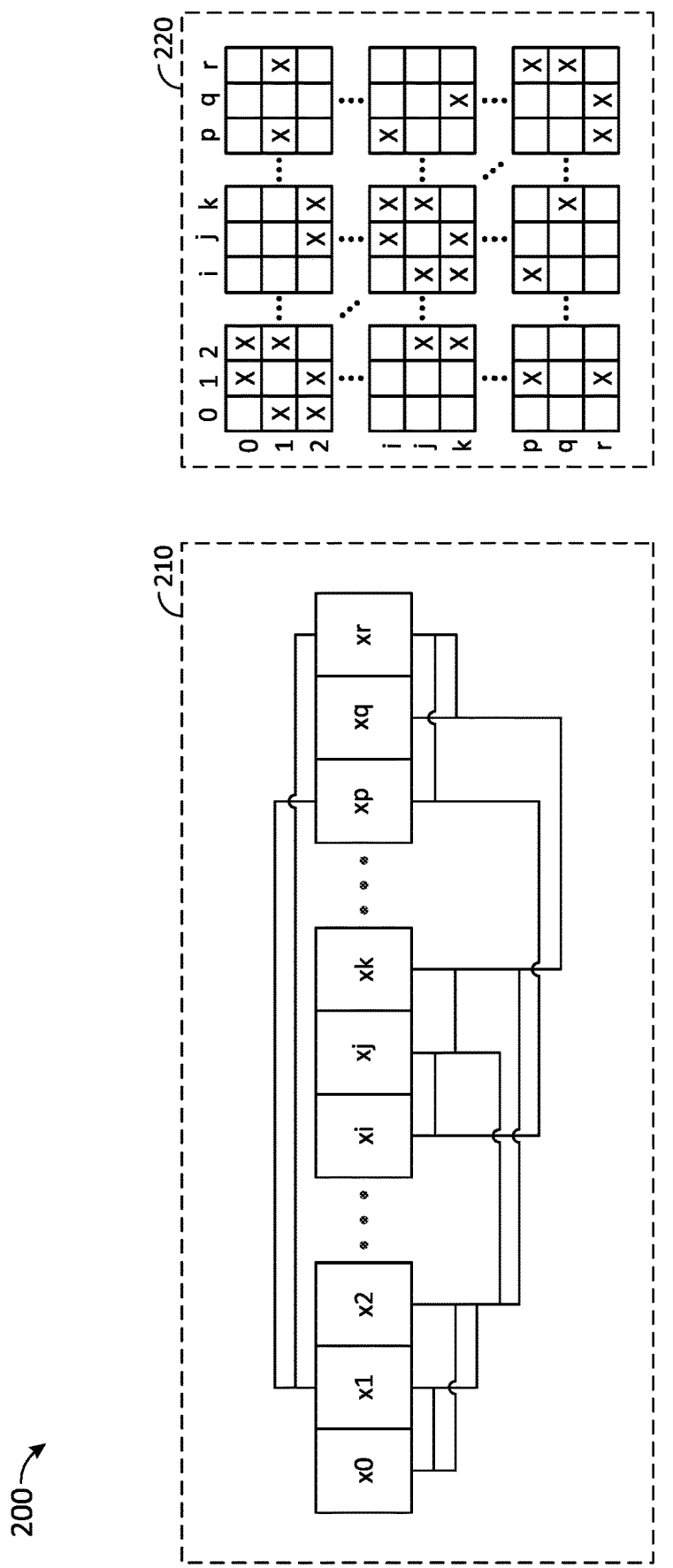
FIG. 2 depicts an example cross-correlation matrix illustrating correlated bits in a message, according to aspects of the present disclosure.

Self-supervised learning may be used to train entropy encoder network 120 to learn the stochasticity of the individual bit fields of first message X as well as the stochasticity of conditional or combinatorial bits of X. A cross-correlation matrix 220, as illustrated in FIG. 2, may illustrate the conditional stochasticity of different bits in message 210. Generally, in cross-correlation matrix 220, non-zero entries may indicate a correlation between different bits in the message 210, while zeroed entries may indicate a lack of correlation between different bits in the message 210.

As illustrated, first message 210 includes bit fields x0 through xr, where r+1 represents the number of fields included in first message 210, and cross-correlation matrix 220 may be sized r+1 by r+1 to allow for the creation of a matrix showing the correlation between different bits in the first message 210. Generally, the diagonal may be blanked, as a correlation between a given bit field and itself may not have any meaning. As discussed, non-zero values may indicate some correlation between bits in the message 210. These correlations may exist for both combinations of two bits p and q (i.e., illustrating that the value of p is correlated with the value of q, and similarly, the value of q is correlated with the value of p.

In some aspects, correlation metrics may be further learned based on the supplemental information S that may be combined with first message X and second message H. By using the supplemental information S, further correlation metrics may be learned based on the conditions associated with different signal quality and/or channel quality information. For example, when the reported signal quality and/or channel quality metrics indicate a sufficiently high signal quality or stable radio conditions for transmission and reception of data, some bit fields may become more or less relevant to receiver performance or may remain unchanged. Fields that are less relevant to receiver performance, and fields that may remain unchanged, may thus be considered replaceable fields in which a second message H may be hidden or otherwise included in message X.

Figure 3:
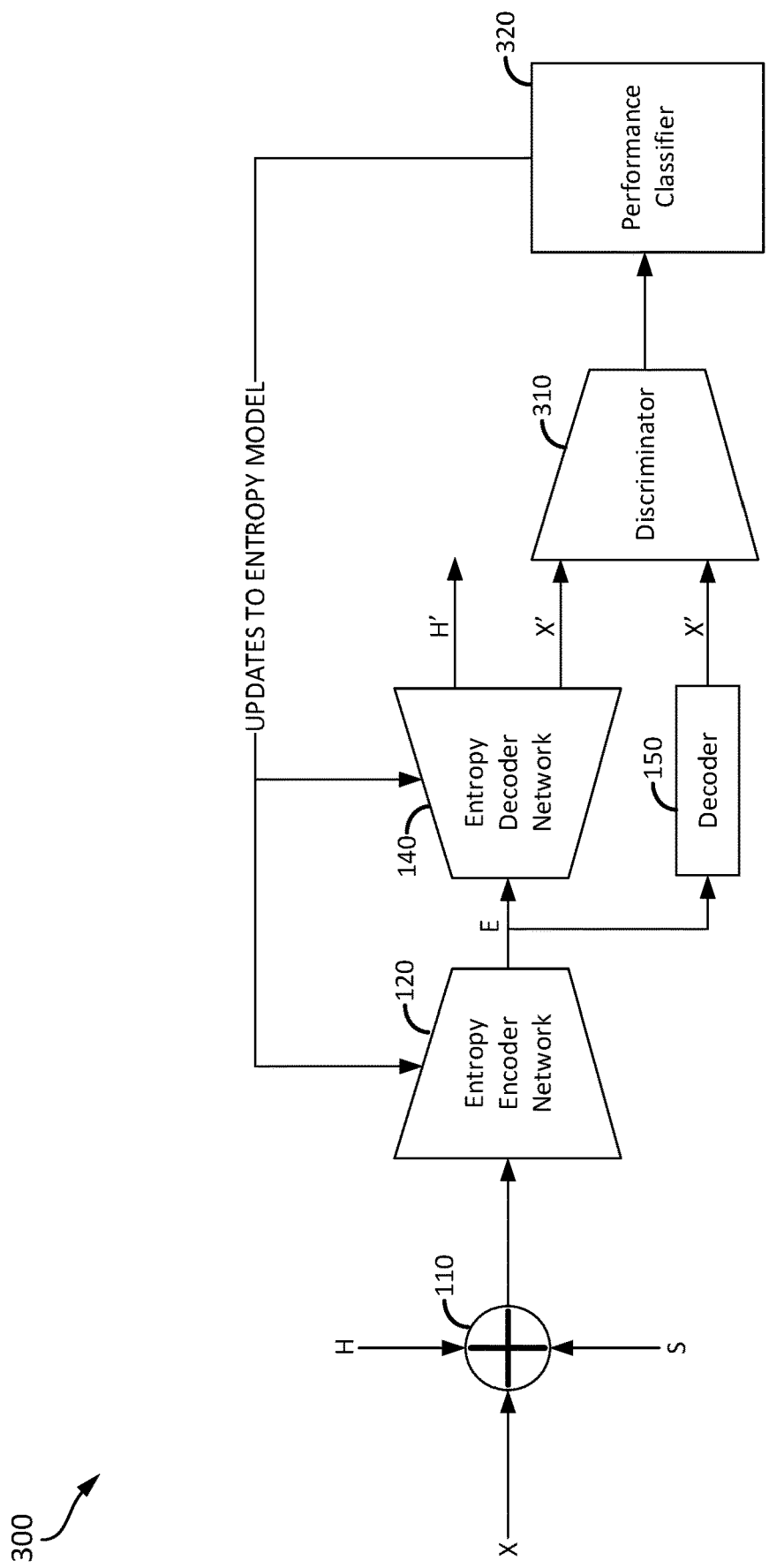
FIG. 3 depicts an example feedback loop for refining an encoder-decoder neural network used in generating emulation messages, according to aspects of the present disclosure.

FIG. 3 illustrates an example feedback loop 300 for training and refining an encoder-decoder neural network (e.g., entropy encoder network 120 and entropy decoder network 140 illustrated in FIG. 1) used in generating and decoding emulation messages, according to aspects of the present disclosure. While feedback loop 300 omits the PHY layer 130 illustrated in FIG. 1 for convenience of illustration, it should be understood that the PHY layer 130 is typically interposed between entropy encoder network 120 and entropy decoder network 140 to allow for transmission and reception of emulation messages in a wireless communications system. To generate messages that appear to be valid messages and can be decoded into valid messages using a standard decoder, the encoder-decoder neural network may be structured as a generative adversarial network (GAN) that continually learns to better emulate messages X while including second message H in the emulation message E by evaluating the approximations of message X recovered by entropy decoder network 140 and decoder 150. Generally, a GAN may use an adversarial module including a discriminator 310 and a classifier 320 to generate feedback for entropy encoder network 120 and entropy decoder network 140 that continually improves the performance of entropy encoder network 120 and entropy decoder network 140.

Generally, discriminator 310 evaluates X' recovered by the entropy decoder network 140 and X" recovered by the decoder 150 and generates a value indicating an amount of difference between X' and X". A classifier 320 can use the output of the discriminator 310 to determine whether the entropy encoder network 120 and entropy decoder network 140 were able to generate a message that was sufficiently close to a real message such that the recovered approximations X' and X" are sufficiently similar. For example, classifier 320 may use thresholding techniques to classify the performance of the entropy encoder network 120 and entropy decoder network 140: difference values or other similarity metrics calculated by discriminator 310 having values below a threshold value may be considered indicative of sufficiently similar system performance, while difference values or other similarity metrics calculated by discriminator 310 having values above the threshold may be considered indicative of different system performance.

If the recovered approximations X' and X" are classified as sufficiently similar, then model parameters used by entropy encoder network 120 and entropy decoder network 140 need not be updated to further improve the performance of the entropy encoder network 120 and the entropy decoder network 140. If, however, classifier 320 determines that the difference between X' and X" is greater than a similarity threshold, then classifier 320 can determine that entropy encoder network 120 and entropy decoder network 140 are to be updated to better emulate a message X. The feedback generated by the classifier 320 may include, for example, information identifying an amount of difference between X' and X" and other information that the entropy encoder network 120 and entropy decoder network 140 can use for refining these networks. Generally, X" may be considered ground truth data, and entropy encoder network 120 and entropy decoder network 140 can use this ground truth information to refine the networks such that an emulation message is generated and decoded by entropy encoder network 120 and entropy decoder network 140 into a value closer to that of X".

Figure 4:
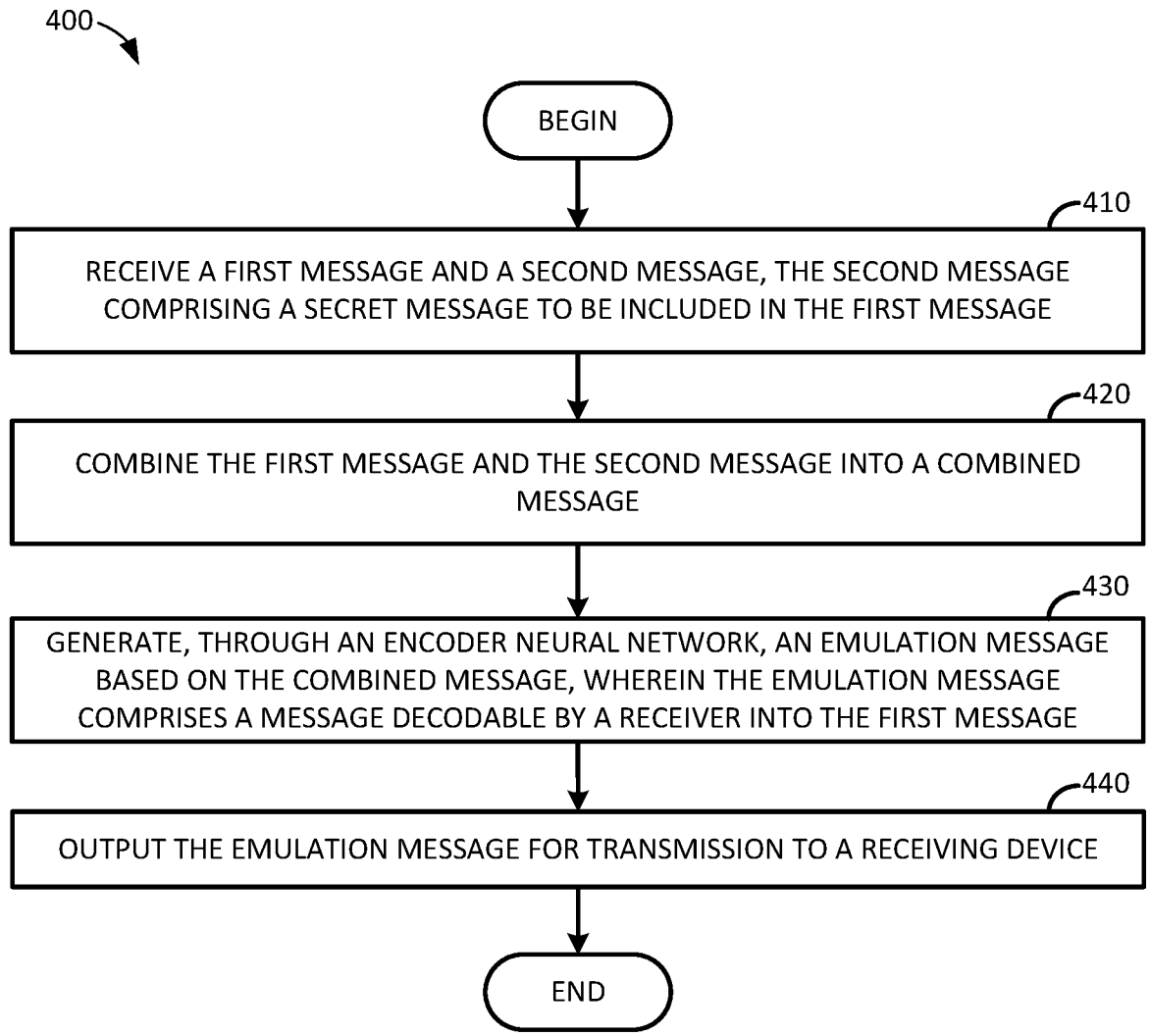
FIG. 4 depicts example operations for generating and transmitting emulation messages in a wireless communications system using an encoder neural network, according to aspects of the present disclosure.

FIG. 4 illustrates example operations 400 for generating emulation messages including a first message and a hidden second message, according to aspects of the present disclosure. Operations 400 may be performed, for example, by a transmitting device, such as a user equipment (UE) or other network entity (e.g., processing system 800 illustrated in FIG. 8) that can generate and transmit messages in a wireless communications network.

As illustrated, operations 400 may begin at block 410, where a first message and a second message are received. The first message may correspond to a legacy message, designated X (e.g., as illustrated in FIG. 1), and the second message may correspond to a non-legacy message, designated H (e.g., as illustrated in FIG. 1), to be included (and hidden) within the first message. The non-legacy message may include information usable by devices supporting other wireless communications standards, information for enabling device-manufacturer-specific functionality, or the like. In some aspects, additional information that can be used in generating realistic emulation messages, designated S (e.g., as illustrated in FIG. 1) may also be received.

At block 420, the first message X and the second message H are combined into a combined message (e.g., by message combiner 110 illustrated in FIG. 1). In some aspects, the combined message may further include supplemental information S that may be used by an encoder neural network to encode the first message X and the second message H into an emulation message E which resembles the first message. This supplemental information S may include, for example, historical signal strength information (e.g., RSRQ, RSSI, etc.), channel quality information (CQI, MCS, etc.), or other information that may affect the values carried in the first message X and thus the values of the emulation message E that resembles the first message X.

At block 430, an emulation message is generated through an encoder neural network (e.g., entropy encoder network 120 illustrated in FIG. 1) based on the combined message. As discussed, the emulation message E may be generated such that E, when decoded by a standard decoder (e.g., a non-neural-network-based decoder), results in an approximation X' of the first message X, where X'=X. In some aspects, the emulation message may further be based on a cross-correlation matrix defining correlations between valid bit values in the first message. These correlations may, for example, indicate which bits have values that are correlated with values of other bits, such that, for two bits p and q, the value of p is correlated with the value of q, and the value of q is also correlated with the value of p.

At block 440, the emulation message is output for transmission to a receiving device. Generally, in outputting the emulation message for transmission, the emulation message may be output to one or more physical layer components of a wireless communications device in order for forward error correction codes (e.g., cyclic redundancy checks or the like) to be applied to the emulation message prior to transmission. Generally, the application of FEC (e.g., through the FEC encoder block of PHY layer 130 illustrated in FIG. 1) may ensure that the emulation message is received with minimal errors, such that E as transmitted by the transmitting device equals E' recovered through an FEC decoder at the receiving device.

Figure 5:
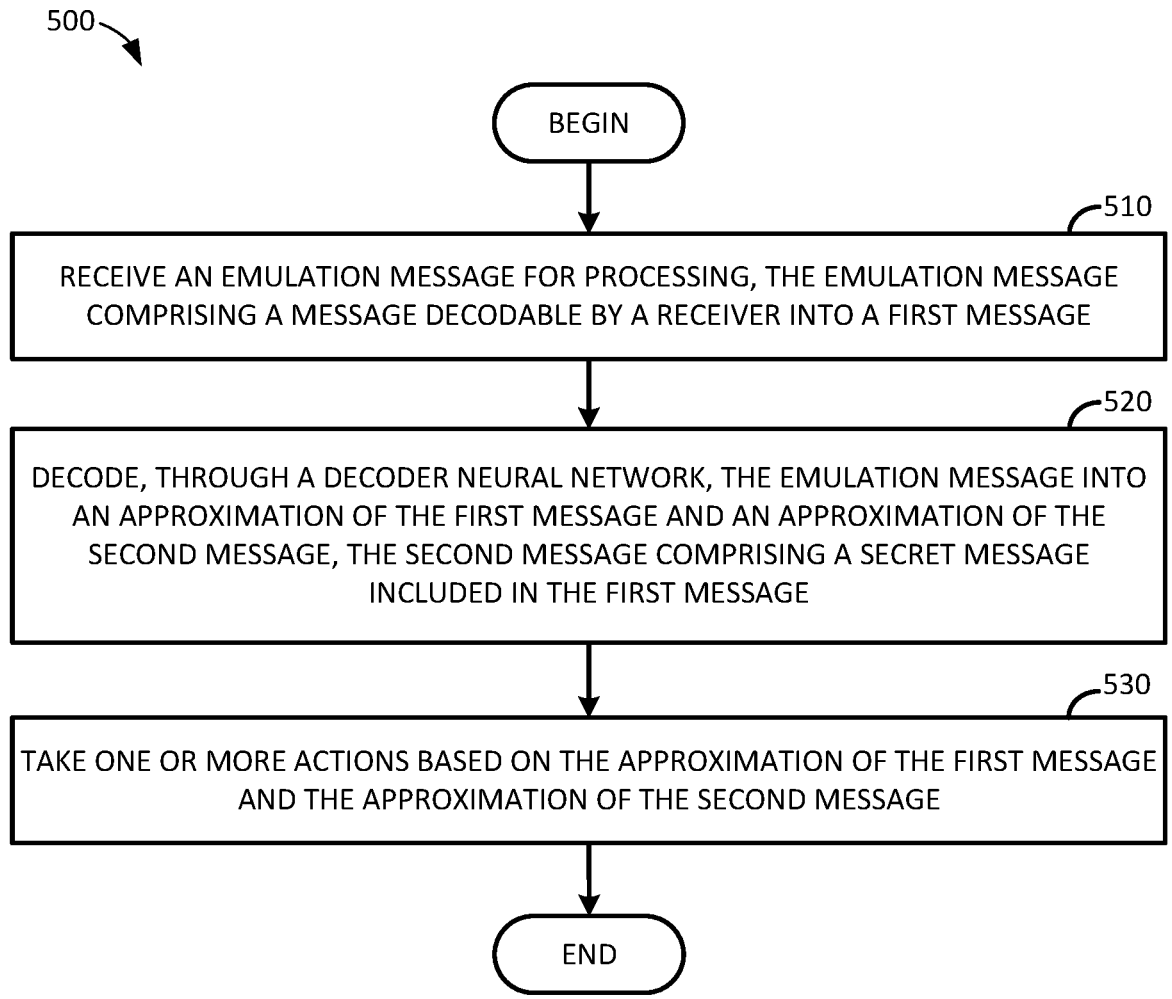
FIG. 5 depicts example operations for receiving and processing emulation messages in a wireless communications system using a decoder neural network, according to aspects of the present disclosure.

FIG. 5 illustrates example operations for receiving and processing emulation messages using a decoder neural network, according to aspects of the present disclosure. Operations 500 may be performed, for example, by a receiving device, such as a user equipment (UE) or other network entity (e.g., processing system 800 illustrated in FIG. 8) that can receive and process messages in a wireless communications network.

As illustrated, operations 500 may begin at block 510, where an emulation message E is received for processing. The emulation message E may comprise a message decodable by a receiver into a first message X.

At block 520, the emulation message is decoded through a decoder neural network, such as entropy decoder network 140 illustrated in FIG. 1 into an approximation X' of the first message X and an approximation H' of a second message H. The second message H may generally be a secret message included inside the emulation message E (which may appear to be a valid first message X to legacy devices). In some aspects, the first message may correspond to a legacy message, and the second message may correspond to a non-legacy message to be included along with the first message (e.g., as a hidden message inside an emulation message E that appears to be a valid first message X to legacy devices). The non-legacy message may include information usable by devices supporting other wireless communications standards, information for enabling device-manufacturer-specific functionality, or the like.

At block 530, one or more actions are taken based on the approximation X' of the first message X and, in some cases, the approximation H' of the second message H. In some aspects, the actions taken based on the approximation of the first message may be those defined by a wireless communications standard for such messages. Meanwhile, the actions taken based on the approximation of the second message may be defined according to the content of the second message. For example, the actions taken based on the approximation of the second message may be actions associated with a different wireless communications standard, actions associated with device-manufacturer-specific functionality, or the like.

In some aspects, an encoder neural network (e.g., entropy encoder network 120) and the decoder neural network (e.g., entropy decoder network 140) may be updated based on self-supervision. In order to update the encoder neural network and the decoder neural network based on self-supervision, the emulation message may be decoded by a standard (non-neural-network-based) decoder (e.g. decoder 150), and a difference may be determined between the decoded emulation message and the approximation of the first message (e.g., through discriminator 310 and performance classifier 320 illustrated in FIG. 3). A classification of the performance of the encoder neural network and the decoder neural network may be generated based on the determined difference, and the encoder neural network and decoder neural network may be updated based on the classification of the performance of the encoder and decoder neural networks.

In some aspects, the classification of the performance of the encoder and decoder neural networks may be generated based on a binary classifier. The binary classifier may be configured to classify the emulation message as a message equivalent to the approximation of the first message or a message different from the approximation of the first message. In some aspects, the classification may be based on a difference between the version of the first message X' recovered by the decoder neural network and the version of the first message X" recovered by the non-neural-network-based decoder.

Figure 6:
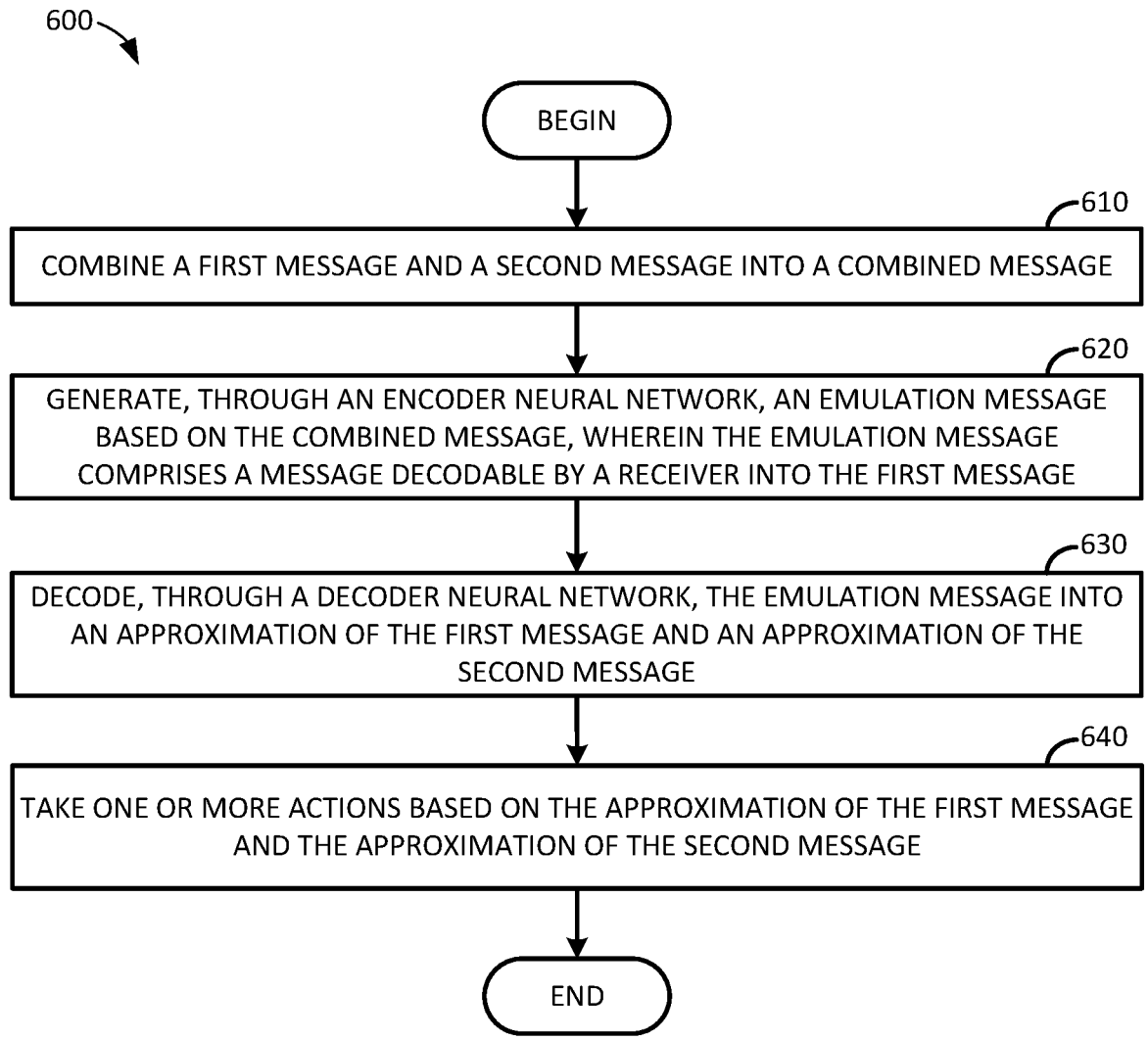
FIG. 6 depicts example operations for communicating in a wireless communications system via emulation messages generated by an encoder-decoder neural network, according to aspects of the present disclosure

FIG. 6 illustrates example operations 600 that may be performed to communicate in a wireless communications system via emulation messages generated by an encoder-decoder neural network and train the encoder-decoder neural network based on a determined difference between messages recovered by a decoder in the encoder-decoder neural network and standard decoder, according to aspects of the present disclosure. Operations 600 may be performed, for example, by a receiving device, such as a user equipment (UE) or other network entity (e.g., processing system 800 illustrated in FIG. 8) that can generate, transmit, receive, and process messages in a wireless communications network.

As illustrated, operations 600 begin at block 610, where a first message X and a second message H are combined into a combined message. As discussed, the first message X may be a legacy message, and the second message H may be a non-legacy message (e.g., associated with a new version of a wireless communications standard, with a different wireless communications standard, with device-manufacturer-specific functionality, etc.).

At block 620, an emulation message E is generated through an encoder neural network, such as entropy encoder network 120 illustrated in FIG. 3, based on the combined message. The emulation message generally comprises a message decodable by a receiver into the first message (or an approximation thereof). As discussed above, the encoder neural network may be trained based on a cross-correlation matrix defining correlations between valid bit values in the first message and, in some aspects, further based on correlations between valid bit values based on one or more of signal strength information or channel quality information.

At block 630, the emulation message is decoded, through a decoder neural network, such as entropy decoder network 140 illustrated in FIG. 3, into an approximation of the first message and an approximation of the second message.

At block 640, one or more actions are taken based on the approximation of the first message and, in some cases, the approximation of the second message. These actions may include processing the first message according to rules defined by a wireless communications standard, and/or performing one or more device-manufacturer-specific actions based on the approximation of the second message.

At block 650, the encoder neural network and decoder neural network are retrained based on a difference between the approximation X' of the first message generated by the decoder neural network and the approximation X" of the first message generated by decoding E using a standard decoder. In this example, at least one of the encoder neural network or the decoder neural network may comprise a generative adversarial network. In some aspects, the generative adversarial network may be updated based on self-supervision through a discriminator (e.g., discriminator 310 illustrated in FIG. 3) and classifier (e.g., performance classifier 320 illustrated in FIG. 3) that examines the decoded emulation message (e.g., decoded through a non-neural-network-based decoder) and the approximation of the first message. Based on a difference between the decoded emulation message and the approximation of the first message, the performance of the encoder neural network and the decoder neural network may be classified, and the encoder and decoder neural network may be updated based on the classification of the emulation message.

Figure 7:
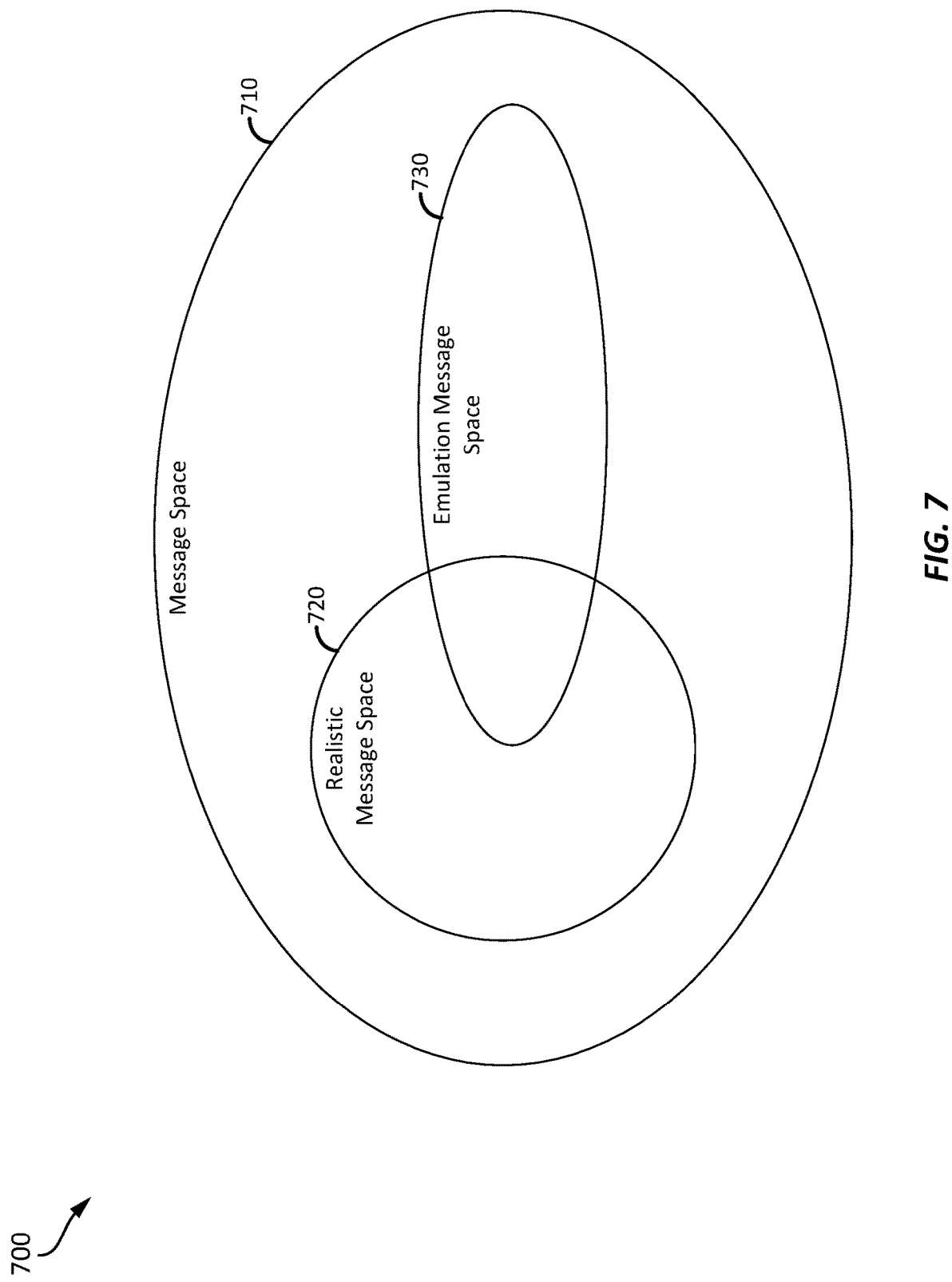
FIG. 7 depicts an example message space in which an encoder-decoder neural network may be trained to generate emulation messages, according to aspects of the present disclosure.

FIG. 7 illustrates an example message space in which an encoder-decoder neural network is trained to generate emulation messages E for a first message X and second message H, according to aspects of the present disclosure. As illustrated, message space 700 includes three spaces: space 710 corresponding to the universe of all legitimate messages that may be generated for a given message with bit size n; space 720 corresponding to realistic messages that may be generated within a wireless communications network (e.g., due to correlations between values of certain fields in the message and channel quality information, signal strength information, etc.); and space 730 corresponding to the emulation messages E that may be generated by an encoder-decoder neural network.

In some aspects, M may be the universe of downlink control information (DCI) messages that may be transmitted in a wireless communications network. While M may cover a large number of combinations of bit values, a subset of those combinations of bit values may be realistic. For example, it may be realistic for a DCI message to include high channel quality information (CQI) values when the supplemental information S indicates high reception quality, but may not be realistic for the DCI message to include low CQI values in such a case. Therefore, space 720 representing the universe of messages that are realistic may be smaller than space 710 representing the universe of possible messages in M.

An entropy encoder network may generate messages within space 730, which includes a portion of space 720 representing the universe of realistic messages and a portion of space 710 representing the universe of all messages. Emulation messages E may not solely reside in space 720, as unused or irrelevant bit fields in realistic messages may be used, in conjunction with other bits in messages from space 710, to embed or otherwise include a second message H in an emulation message.

Generally, the set of messages of $\|X\|$ bits may have $2^{\|X\|}$ degrees of freedom. An entropy encoder, as discussed herein, may take $\|X\|+\|H\|$ bits and encode those bits into $\|E\|$, where $\|X\|+\|H\|>\|E\|$. In some aspects, when $\|H\|0$, the channel conditions and other supplemental information S may be such that a message H may not be included in the emulation message without degrading the performance of a system. For example, when channel conditions change significantly, meaning that many bits in a message may have a different value and meaning from those in preceding messages, there may be an insufficient number of bits available for immersing message H into message X and delivering the combination of X and H in an emulation message E that would decode to X.

Figure 8:
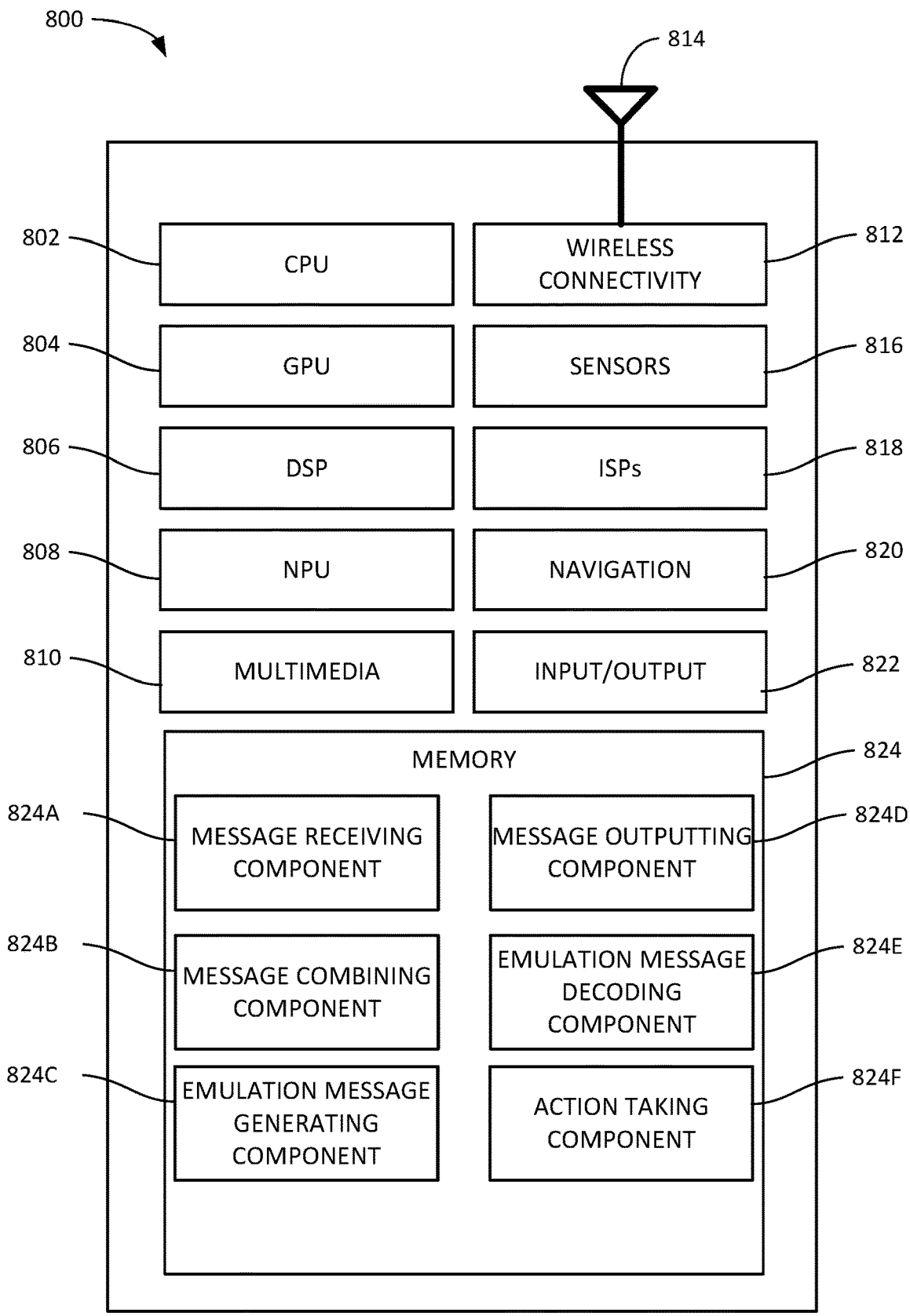
FIG. 8 depicts an example implementation of a processing system on which an encoder-decoder neural network may be used to generate, transmit, receive, and decode emulation messages for transmission in a wireless communications system, according to aspects of the present disclosure.

Example Processing Systems for Encoding and Decoding Emulation Messages Using Encoder-Decoder Neural Networks FIG. 8 depicts an example processing system 800 for transmitting and receiving emulation messages generated (encoded) and decoded using an encoder-decoder neural network, such as described herein for example with respect to FIGS. 4 through 6.

Processing system 800 includes a central processing unit (CPU) 802, which in some examples may be a multi-core CPU. Instructions executed at the CPU 802 may be loaded, for example, from a program memory associated with the CPU 802 or may be loaded from a memory 824.

Processing system 800 also includes additional processing components tailored to specific functions, such as a graphics processing unit (GPU) 804, a digital signal processor (DSP) 806, a neural processing unit (NPU) 808, a multimedia processing unit 810, a wireless connectivity component 812.

An NPU, such as NPU 808, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as NPU 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece through an already trained model to generate a model output (e.g., an inference).

In one implementation, NPU 808 is a part of one or more of CPU 802, GPU 804, and/or DSP 806.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 812 is further coupled to one or more antennas 814.

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes message receiving component 824A, message combining component 824B, emulation message generating component 824C, message outputting component 824D, emulation message decoding component 824E, action taking component 824F, encoder-decoder neural network component 824G, and encoder-decoder retraining component 824H. The depicted components, and others not depicted, may be configured to perform various aspects of the methods described herein.

Generally, processing system 800 and/or components thereof may be configured to perform the methods described herein.

Notably, in other aspects of the present disclosure, elements of processing system 800 may be omitted, such as where processing system 800 is a server computer or the like. For example, multimedia processing unit 810, wireless connectivity component 812, sensors 816, ISPs 818, and/or navigation component 820 may be omitted in other aspects of the present disclosure. Further, elements of processing system 800 may be distributed, such as distributing, amongst various components of a distributed computing environment, features related to training a model and features related to using the model to generate inferences.

Example Clauses

Implementation details of various aspects of the present disclosure are presented in the following numbered clauses.

Clause 1: A processor-implemented method, comprising: receiving a first message and a second message, wherein the second message comprises a secret message to be hidden inside the first message; combining the first message and the second message into a combined message; generating, through an encoder neural network, an emulation message based on the combined message, wherein the emulation message comprises a message decodable by a receiving device into the first message; and outputting the emulation message for transmission to the receiving device.

Clause 2: The method of Clause 1, wherein generating the emulation message is further based on supplemental information.

Clause 3: The method of Clause 2, wherein the supplemental information comprises a historical signal strength information.

Clause 4: The method of Clause 2 or 3, wherein the supplemental information comprises historical channel quality information.

Clause 5: The method of any of Clauses 1 through 4, wherein the encoder neural network comprises a neural network trained to generate the emulation message based on a cross-correlation matrix defining correlations between valid bit values in the first message.

Clause 6: The method of any of Clauses 1 through 5, wherein the first message comprises a legacy message and wherein the second message comprises a non-legacy message embedded into the legacy message.

Clause 7: A processor-implemented method, comprising: receiving an emulation message for processing, wherein the emulation message comprises a message decodable by a receiver into a first message; decoding, through a decoder neural network, the emulation message into an approximation of the first message and an approximation of a second message, the second message comprising a secret message hidden within the first message; and taking one or more actions based on the approximation of the first message and the approximation of the second message.

Clause 8: The method of Clause 7, wherein the first message comprises a legacy message and wherein the second message comprises a non-legacy message embedded into the legacy message.

Clause 9: The method of any Clause 7 or 8, further comprising updating an encoder neural network and the decoder neural network based on self-supervision.

Clause 10: The method of Clause 9, wherein updating the encoder neural network and the decoder neural network based on self-supervision comprises: decoding the emulation message through a decoder different from the decoder neural network; determining a difference between the decoded emulation message and the approximation of the first message; generating a classification of performance of the encoder neural network and the decoder neural network based on the determined difference; and updating the encoder neural network and the decoder neural network based on the classification of the performance of the encoder neural network and the decoder neural network.

Clause 11: The method of Clause 10, wherein generating the classification of the performance of the encoder neural network and the decoder neural network comprises generating the classification based on a binary classifier configured to classify the emulation message as a message equivalent to the approximation of the first message or a message different from the approximation of the first message.

Clause 12: A processor-implemented method, comprising: combining a first message and a second message into a combined message; generating, through an encoder neural network, an emulation message based on the combined message, wherein the emulation message comprises a message decodable by a receiver into the first message; decoding, through a decoder neural network, the emulation message into an approximation of the first message and an approximation of the second message; and taking one or more actions based on the approximation of the first message and the approximation of the second message.

Clause 13: The method of Clause 12, wherein the encoder neural network and the decoder neural network each comprise a generative adversarial network.

Clause 14: The method of Clause 12 or 13, wherein the encoder neural network is trained to generate the emulation message based on minimizing a carrier message loss function, a hidden message loss function, and an emulation message loss function.

Clause 15: The method of any of Clauses 12 through 14, wherein the encoder neural network is further configured to generate the emulation message based on supplemental information.

Clause 16: The method of Clause 15, wherein the supplemental information comprises a historical signal strength information.

Clause 17: The method of Clause 15 or 16, wherein the supplemental information comprises historical channel quality information.

Clause 18: The method of any of Clauses 12 through 17, further comprising updating the encoder neural network and the decoder neural network based on self-supervision.

Clause 19: The method of Clause 18, wherein updating the encoder neural network and the decoder neural network based on self-supervision comprises: decoding the emulation message through a decoder different from the decoder neural network; determining a difference between the decoded emulation message and the approximation of the first message; generating a classification of performance of the encoder neural network and the decoder neural network based on the determined difference; and updating the encoder neural network and the decoder neural network based on the classification of the performance of the encoder neural network and the decoder neural network.

Clause 20: The method of Clause 19, wherein generating the classification of the performance of the encoder neural network and the decoder neural network comprises generating the classification based on a binary classifier configured to classify the emulation message as a message equivalent to the approximation of the first message or a message different from the approximation of the first message.

Clause 21: The method of any of Clauses 12 through 22, wherein the encoder neural network is trained based on a cross-correlation matrix defining correlations between valid bit values in the first message.

Clause 22: The method of Clause 21, wherein the cross-correlation matrix further defines correlations between valid bit values in the first message based on one or more of signal strength information or channel quality information.

Clause 23: The method of any of Clauses 12 through 22, wherein the first message comprises a legacy message and wherein the second message comprises a non-legacy message embedded into the legacy message.

Clause 24: A processing system comprising: a memory comprising computer-executable instructions; and one or more processors configured to execute the computer-executable instructions and cause the processing system to perform a method in accordance with any of Clauses 1-23.

Clause 25: A processing system comprising means for performing a method in accordance with any of Clauses 1-23.

Clause 26: A non-transitory computer-readable medium comprising computer-executable instructions that, when executed by one or more processors of a processing system, cause the processing system to perform a method in accordance with any of Clauses 1-23.

Clause 27: A computer program product embodied on a computer-readable storage medium comprising code for performing a method in accordance with any of Clauses 1-23.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
   receiving a first message and a second message, wherein the second message comprises a message to be combined with the first message;
   combining the first message and the second message into a combined message based on embedding the second message into the first message;
   generating, through an encoder neural network, an emulation message based on the combined message, wherein the first message and the emulation message comprise valid messages when decoded by a first type of decoder; and
   outputting the emulation message for transmission to a first receiving device having the first type of decoder and to a second receiving device having a second type of decoder, the second type of decoder being a neural network-based decoder corresponding to the encoder neural network.

2. The method of claim 1, wherein generating the emulation message is further based on supplemental information.

3. The method of claim 2, wherein the supplemental information comprises one or more of historical signal strength information or historical channel quality information.

4. The method of claim 1, wherein the encoder neural network comprises a neural network trained to generate the emulation message based on a cross-correlation matrix defining correlations between valid bit values in the first message.

5. The method of claim 1, wherein the first message comprises a first type of message decodable by the first type of decoder and wherein the second message comprises a second type of message embedded in the first type of message, the second type of message being decodable by a second type of decoder but not decodable by the first type of decoder.

6. The method of claim 5, wherein the first type of decoder comprises a non-machine-learning-model-based decoder, and wherein the second type of decoder comprises a decoder portion of an autoencoder implemented using a machine learning model.

7. A processor-implemented method, comprising:
   receiving a message for processing, wherein the message comprises an emulation message emulating a first message and decodable by a non-machine-learning-model-based decoder at a receiver into the first message;
decoding, through a decoder neural network, the message into an approximation of the first message and an approximation of a second message, the second message comprising a message embedded within the first message; and
taking one or more actions based on the approximation of the first message and the approximation of the second message.

8. The method of claim 7, wherein the first message comprises a first type of message decodable by the non-machine-learning-model-based decoder and wherein the second message comprises a second type of message embedded in the first type of message, the second type of message being decodable by the decoder neural network but not decodable by the non-machine-learning-model-based decoder.

9. The method of claim 7, further comprising updating an encoder neural network and the decoder neural network based on self-supervision.

10. The method of claim 9, wherein updating the encoder neural network and the decoder neural network based on self-supervision comprises:
decoding the emulation message through non-machine-learning-model-based decoder different from the decoder neural network;
determining a difference between the decoded emulation message and the approximation of the first message;
generating a classification of performance of the encoder neural network and the decoder neural network based on the determined difference; and
updating the encoder neural network and the decoder neural network based on the classification of the performance of the encoder neural network and the decoder neural network.

11. The method of claim 10, wherein generating the classification of the performance of the encoder neural network and the decoder neural network comprises generating the classification based on a binary classifier configured to classify the emulation message as a message equivalent to the approximation of the first message or a message different from the approximation of the first message.

12. A processor-implemented method, comprising:
combining a first message and a second message into a combined message based on embedding the second message into the first message;
generating, through an encoder neural network, an emulation message based on the combined message, wherein the emulation message comprises a message decodable by a non-machine-learning-model-based decoder at a receiver into the first message;
decoding, through a decoder neural network, the emulation message into an approximation of the first message and an approximation of the second message; and
taking one or more actions based on the approximation of the first message and the approximation of the second message.

13. The method of claim 12, wherein the encoder neural network and the decoder neural network each comprise a generative adversarial network.

14. The method of claim 12, wherein the encoder neural network is trained to generate the emulation message based on minimizing a carrier message loss function, a hidden message loss function, and an emulation message loss function.

15. The method of claim 12, wherein the encoder neural network is further configured to generate the emulation message based on supplemental information.

16. The method of claim 15, wherein the supplemental information comprises one or more of historical signal strength information or historical channel quality information.

17. The method of claim 12, further comprising updating the encoder neural network and the decoder neural network based on self-supervision.

18. The method of claim 17, wherein updating the encoder neural network and the decoder neural network based on self-supervision comprises:
decoding the emulation message through a decoder different from the decoder neural network;
determining a difference between the decoded emulation message and the approximation of the first message;
generating a classification of performance of the encoder neural network and the decoder neural network based on the determined difference; and
updating the encoder neural network and the decoder neural network based on the classification of the performance of the encoder neural network and the decoder neural network.

19. The method of claim 18, wherein generating the classification of the performance of the encoder neural network and the decoder neural network comprises generating the classification based on a binary classifier configured to classify the emulation message as a message equivalent to the approximation of the first message or a message different from the approximation of the first message.

20. The method of claim 12, wherein the encoder neural network is trained based on a cross-correlation matrix defining correlations between valid bit values in the first message.

21. The method of claim 20, wherein the cross-correlation matrix further defines correlations between valid bit values in the first message based on one or more of signal strength information or channel quality information.

22. The method of claim 12, wherein the first message comprises a first type of message decodable by the non-machine-learning-model-based decoder and wherein the second message comprises a second type of message embedded in the first type of message, the second type of message being decodable by the decoder neural network but not decodable by the non-machine-learning-model-based decoder.

23. A system, comprising:
at least one memory having executable instructions stored thereon; and
one or more processors configured to execute the executable instructions in order to cause the system to:
receive a first message and a second message, wherein the second message comprises a message to be combined with the first message;
combine the first message and the second message into a combined message based on embedding the second message into the first message;
generate, through an encoder neural network, an emulation message based on the combined message, wherein the first message and the emulation message comprise valid messages when decoded by a first type of decoder; and
output the emulation message for transmission to a receiving device having the first type of decoder and to a second receiving device having a second type of decoder, the second type of decoder being a neural network-based decoder corresponding to the encoder neural network.

24. The system of claim 23, wherein the one or more processors are configured to execute the executable instructions in order to cause the system to generate the emulation message further based on supplemental information.

25. The system of claim 24, wherein the supplemental information comprises one or more of historical signal strength information or historical channel quality information.

26. The system of claim 23, wherein the encoder neural network comprises a neural network trained to generate the emulation message based on a cross-correlation matrix defining correlations between valid bit values in the first message.

27. The system of claim 23, wherein the first message comprises a first type of message decodable by the first type of decoder and wherein the second message comprises a second type of message embedded in the first type of message, the second type of message being decodable by a second type of decoder but not decodable by the first type of decoder.

* * * * *